M. J. VINIK.
INTERMITTENT FEEDING MECHANISM.
APPLICATION FILED NOV. 9, 1917.
1,428,927.
Patented Sept. 12, 1922.
3 SHEETS—SHEET 1.
Fig. 1.
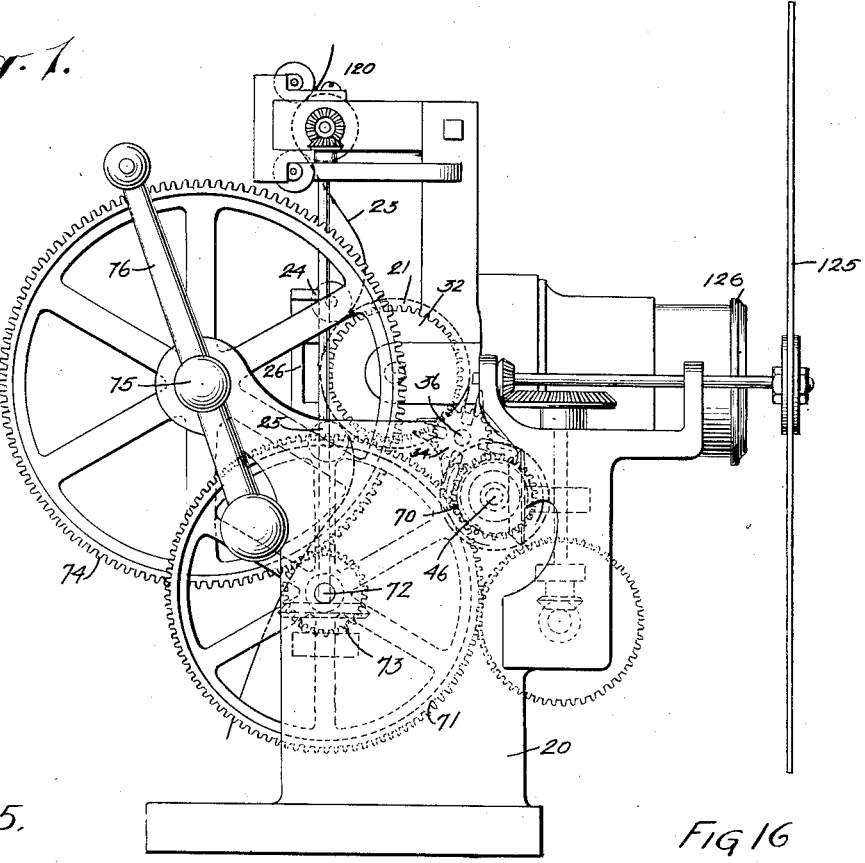
FIG. 15.
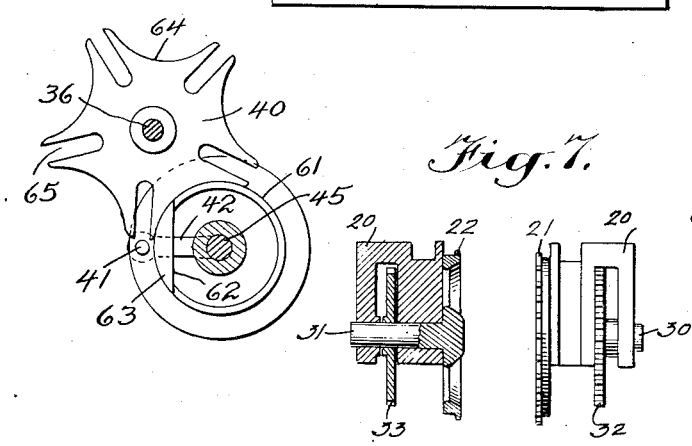
Fig. 7.
FIG. 16
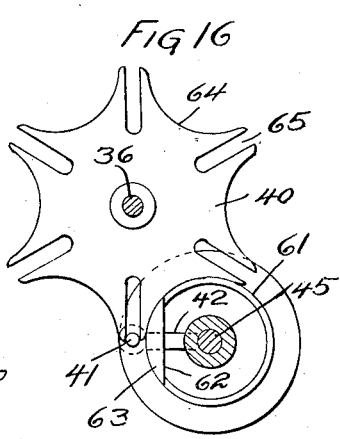
WITNESSES
INVENTOR
Matthias J. Vinik
BY
ATTORNEYS

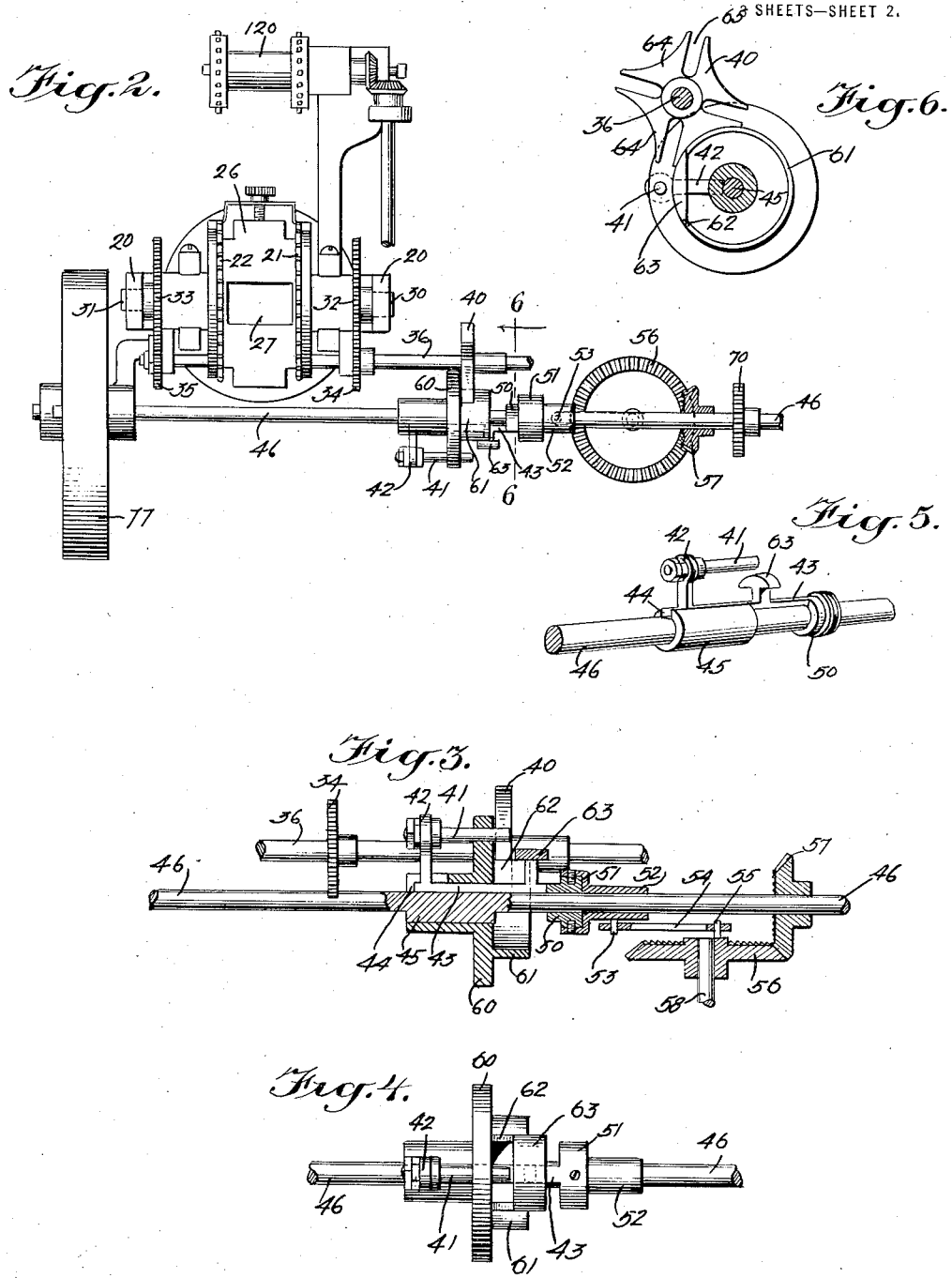

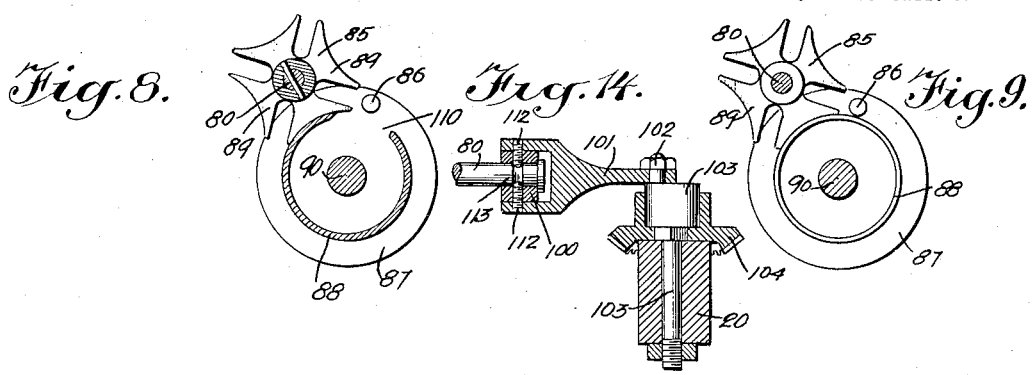
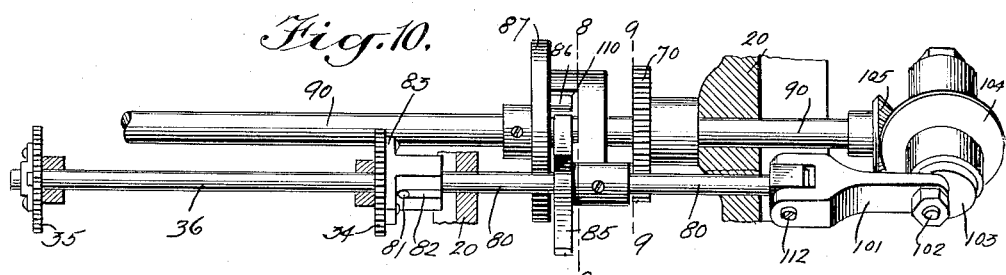
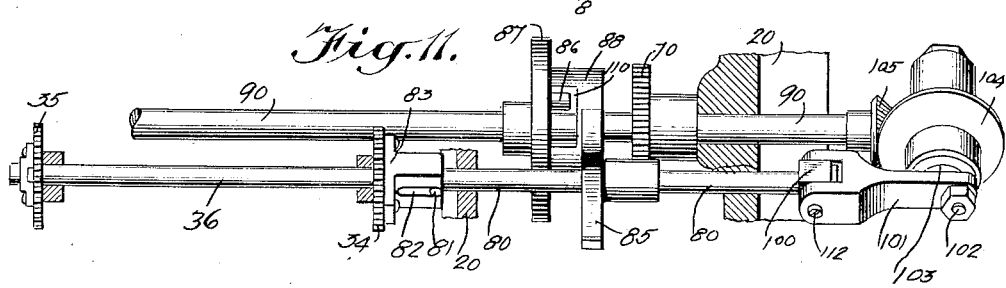
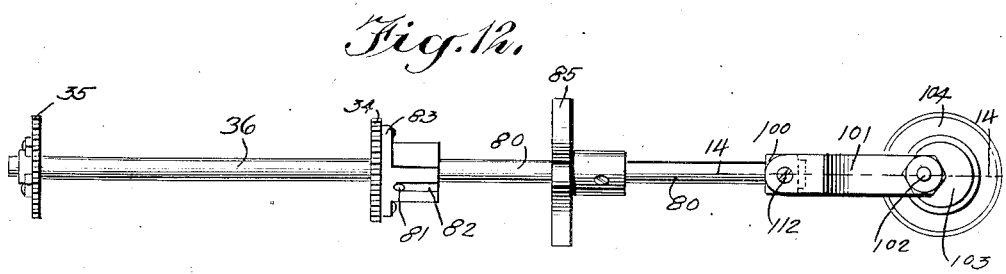
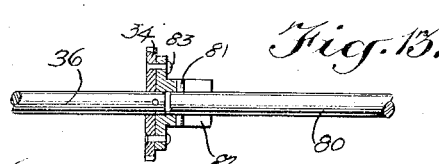

Patented Sept. 12, 1922.

1,428,927

UNITED STATES PATENT OFFICE.

MATTHIAS J. VINIK, OF NEW YORK, N. Y.

INTERMITTENT-FEEDING MECHANISM.

Original application filed January 29, 1914, Serial No. 815,162. Divided and this application filed November 9, 1917. Serial No. 201,136.

*To all whom it may concern:*

Be it known that I, MATTHIAS J. VINIK, a citizen of Lithuania, and a resident of the city of New York, borough of Manhattan, in the county and State of New York, have invented a new and Improved Intermittent-Feeding Mechanism, of which the following is a full, clear, and exact description, this being a division of the application for Letters Patent of the United States for a moving picture machine, Serial No. 815,162, filed by me on January 29, 1914, and Patent Number 1,254,552 of January 22, 1918.

The object of the invention is to provide a new and improved intermittent feeding mechanism more especially designed to reduce the strain on the film when changing from one picture to another so as to permit an increase in the speed of the change without damaging the film in order to make it possible to eliminate all flicker and to utilize a greater percentage of the arc light or other source of light, and to make it impossible to detect the change or so called "travel ghost" when forced to discard the shutter on account of a weak source of light.

In order to produce the desired result, use is made of a Geneva star wheel having, at least, five radial slots, a revoluble pin and means to move the said star wheel or the said pin axially one relative to the other with a view to move one in and out of the path of the other.

A practical embodiment of the invention is represented in the accompanying drawings forming a part of this specification, in which similar characters of reference indicate corresponding parts in all the views.

Figure 1 is a side elevation of the intermittent feeding mechanism as applied to a moving picture machine;

Figure 2 is a rear elevation of the same with the guide rollers for the film omitted;

Figure 3 is an enlarged inverted plan view of the intermittent feeding mechanism;

Figure 4 is a plan view of the same;

Figure 5 is a perspective view of a portion of the same and showing more particularly the pin;

Figure 6 is an enlarged sectional side elevation of the intermittent feeding mechanism on the line 6—6 of Figure 2;

Figure 7 is an elevation of the film feeding device, one of the wheels and its support being shown in section;

Figure 8 is a sectional side elevation of the Geneva stop for the modified form of actuating mechanism shown in Figure 10, the section being on the line 8—8 of Figure 10;

Figure 9 is a similar view of the same on the line 9—9 of Figure 10;

Figure 10 is a plan view with parts in section of the modified form of the actuating mechanism;

Figure 11 is a similar view of the same with the parts in a different position;

Figure 12 is a face view of the wheel shaft, the intermittently rotating and lengthwise sliding shaft, and the coupling connecting said shafts with each other;

Figure 13 is a sectional side elevation of the coupling connecting the wheel shaft and the Geneva wheel shaft with each other;

Figure 14 is a cross section of the crank mechanism for imparting a sliding movement to the shaft of the Geneva stop wheel, the section being on the line 14—14 of Figure 12;

Figure 15 is a sectional side elevation of the intermittent feeding mechanism provided with a star wheel having five radial slots; and Figure 16 is a similar view of the same and showing a star wheel having six radial slots.

In moving picture machines as heretofore constructed it has been found impracticable to feed the film intermittently through the machine beyond a fixed speed of 3 to 1, which is a ratio between the period of film's rest and motion as obtainable by means of the well known combination of a four pointed Geneva star and cam. In this combination the ratio between the rest and motion of the film is fixed, that is, it cannot be varied, because the driving pin of the cam must enter the slots of the Geneva star tangentially as otherwise a very undesirable blow or shock is produced. A ratio between the rest and motion of 5 to 1 could be obtained by a combination of a three pointed Geneva star and cam, but it was found impracticable to use this high speed because, with this arrangement, at the usual rate at which the motion pictures are now shown, 16—17 pictures per second, the film changes from one picture to a next one in about 1/100 part of a second, and in half of this time, or in 1/200 part of a second the motion of the film reaches a velocity of 21.0 feet per second and a maximum pull of about 131 lbs. is exerted against it, and as the film is engaged by about only four holes by the small sprocket of the three pointed star, the strain on the film is so great that the holes are torn and the film destroyed. (The pull is calculated by the formula: $f=\dfrac{WV}{gT}$, in which the resistance of film to motion owing to the tension springs is assumed to be one pound, and is expressed in this formula by $w$). In the four pointed Geneva star and cam, the highest velocity the film reaches is about 10 feet per second and a maximum pull of about 42 lbs., but as the film is engaged by about six sprockets, this maximum pull amounts only to about 7 lbs., per each hole of the film. In the three pointed Geneva star, the film is engaged by about only four holes, producing a strain of about 33 lbs. per hole or sufficient to tear the holes and destroy the film. With my improvements presently described in detail, and when used in an ordinary moving picture machine, that is, a machine in which the film is fed through stationary film tracks and tension springs, a ratio between the periods of rest and motion of 5 to 1 is obtained when a six pointed Geneva star is used, see Figure 16, but although the change of the film from one picture to another is made in the same length of time as with the three pointed Geneva star as used heretofore, the highest velocity which the film reaches is only 12.5 feet per second and in addition to this the film is engaged by about 14 sprocket holes owing to the large size of the sprocket of the six pointed Geneva star wheel, so that although the maximum pull on the film is about 78 lbs., the strain on each hole of the film is less than 6 lbs. and therefore the strain on the film and the sprocket holes is safely within the limits of the strength of the film, in fact it is much less than the strain on machines heretofore used. By using my improvements in conjunction with the rolling contact moving picture machines (my application No. 815,162 patented Jan. 22, 1918 No. 1,254,552), as presently described in detail, a ratio of rest to motion of 5 to 1, or 5.66 to 1, or 7 to 1, or even 11 to 1 can be safely employed by using four or three pointed Geneva stars and corresponding reducing gears. The higher the ratio of rest to motion the more times the picture can be covered between the changes, so that with my improvements four to six blade shutters can be used and consequently all traces of flicker eliminated, and in case of a weak light the shutter can be dispensed with as there is practically no travel ghost owing to the quickness of the change.

The intermittent feeding mechanism, which forms the subject matter of this application, is shown applied to a moving picture machine which is mounted on a suitably constructed frame 20 in which are journaled spaced sprocket feed wheels 21, 22 (see Figure 7), around a portion of which passes the film 23 provided with the usual series of pictures. The film 23 is held in contact with the peripheral faces of the feed wheels 21, 22 by the use of friction rollers 24, 25 journaled in the upper and lower portions of the plate 26 provided with the usual opening 27 for the passage of the rays of light to the curved or segmental portion of the film held at the time opposite the plate opening on the peripheral faces of the wheels 21, 22.

In order to impart an intermittent rotary motion to the wheels 21, 22 at the ratios above mentioned, the following arrangement is made: On the shafts 30, 31 carrying the wheels 21, 22 are secured gear wheels 32, 33 in mesh with pinions 34, 35 (see Figure 2) secured on a shaft 36 journaled in suitable bearings arranged on the main frame 20. On the shaft 36 is secured a star wheel 40 forming part of a Geneva movement and adapted to be engaged by a pin 41 mounted on a pin carrier and to turn therein, said pin carrier being in the form of an arm 42 extending from a bar 43 mounted to slide in a groove 44 formed lengthwise on an enlargement 45 on a driven shaft 46. The bar 43 is attached to a circular head 50 mounted to turn in a bearing 51 of a sleeve 52 loosely mounted on the shaft 46 to slide thereon. The sleeve 52 is provided with a pivot pin 53 engaged by a pitman 54 connected with a crank pn 55 on the face of a bevel gear wheel 56 in mesh with a pinion 57 secured on the shaft 46. The gear wheel 56 is secured on a shaft 58 mounted to turn in suitable bearings arranged on the main frame 20. When the shaft 46 is rotated the pitman 54 imparts a sliding motion to the sleeve 52 whereby a sliding motion is given to the bar 43 and the pin 41 to move the latter into and out of the path of the star wheel 40. It is understood that the bar 43 rotates with the shaft 46 so that the pin 41 is revolved, and this pin imparts a turning motion to the star wheel 40 whenever the pin is in engagement with the said star wheel 40. The pin 41 slides in a wheel 60 mounted on the shaft 46 and having a hub 61 provided with an opening 62 adapted to be closed by a segmental shoe 63 attached to the bar 43. Thus when the pin 41 moves out of the path of the star wheel 40 then the shoe 63 passes into the opening 62 and closes the same to hold the star wheel 40 against turning, it being understood that the usual recesses 64 of the star wheel 40 are adapted to engage the peripheral face of the hub 61 to hold the star wheel from turning. When the pin 41 moves into the path of the star wheel 40 then the shoe 63 moves out of the opening 62 to allow the corresponding slotted point 65 of the star wheel 40 to pass through the said opening at the time the star wheel 40 is turned by the pin 41. It will be noticed that when the machine is running a reciprocating motion is given by the crank pin 55, pitman 54, sleeve 52, bar 43, and arm 42 to the pin 41 to move the latter in and out of engagement with a corresponding slot in the star wheel 40 so that the four pointed star wheel shown in Figure 6 is given a quarter turn during every second revolution of the shaft 46. When using the five-pointed star wheel shown in Figure 15, a fifth of a turn is given to this star wheel during every second revolution of the shaft 46, and in case the six pointed star wheel shown in Figure 16 is used then a sixth of a turn is given to this six-pointed star wheel during every second revolution of the shaft 46. The pin 41 is preferably mounted to rotate in the arm 42 thus insuring uniform wear of the pin and thereby increasing its life. By reference to Figures 6, 15 and 16 it will be noticed that the star wheel 40 has its slots tangential to the pin 41 so that the latter correctly enters the slots and thereby turns the star wheel without jerk or jar.

The shaft 46 is provided with a pinion 70 in mesh with a gear wheel 71 secured on a shaft 72 (see Figure 1) journaled in suitable bearings arranged on the main frame 20. On the shaft 72 is secured a pinion 73 in mesh with a gear wheel 74 secured on the main driving shaft 75 journaled on the main frame 20 and provided with a suitable handle 76 under the control of the operator for turning the shaft 75. It will be noticed that when the shaft 75 is turned, the train of gear wheels consisting of the gear wheel 74, pinion 73, gear wheel 71 and pinion 70 imparts a rotary motion to the shaft 46 thus rotating the wheel 60 and causing the pin 41 to engage and turn the star wheel 40 whereby an intermittent rotary motion is given to the shaft 36 and consequently to the wheels 21, 22 by the pinions 34, 35 and the gear wheels 32, 33. It will be noticed that when the shaft 46 is rotated then the pinion 57 rotates the gear wheel 56 whereby a sliding movement is given to the pin 41, as previously explained to move the pin in and out of the path of the star wheel 40. It is understood that the pin 41 moves alternately in and out of the path of the star wheel 40 and the pin wheel 60 makes one revolution without the pin 41 engaging the star wheel 40 and makes a second revolution engaging the star wheel 40 to give the latter a quarter turn, it being understood that the star wheel is provided with four radial slots, as indicated in Figure 6, thus producing a ratio of 1 to 7 or, in other words, the image on the film at the opening 27 is in motion one-seventh of the length of time the image is at rest. In case a higher ratio is desired the star wheel 40 is provided with three radial slots so that the ratio is 1 to 11, that is, the image on the film opposite the opening 27 is in motion one-eleventh of the time the picture is at rest. The shaft 47 is provided with the usual fly wheel 77 to insure the steady running of the machine.

In the modified form shown in Figures 8 to 13, the shaft 36 carrying the pinions 34 and 35 is connected with a shaft 80 mounted to turn in suitable bearings arranged on the main frame 20 and adapted to slide longitudinally in the said bearings. The shaft 80 is provided with a pin 81 (see Figures 10, 11, 12 and 13) slidingly engaging a slot 82 formed in a coupling member 83 secured to the pinion 34. It will be noticed that when the shaft 80 is turned the pin 81 turns the coupling 83 and consequently the shaft 36, and the slot 82 is of such length as to correspond to the lengthwise throw given to the shaft 80 so that the pin 81 remains at all times in coupling engagement with the slot 82 of the coupling member 83. On the shaft 80 is secured a star wheel 85 forming part of a Geneva movement and adapted to be engaged by a pin 86 projecting from the face of a wheel 87 having a hub 88 engaging the usual peripheral portion 89 on the star wheel 85. The wheel 87 is secured on a shaft 90 connected by the train of gear wheels with the shaft 75, as previously described. When the shaft 90 is rotated on the operator turning the handle 76 then the wheel 87 rotates with the shaft 90 and its pin 86 engages and turns the star wheel 85 whereby an intermittent rotary motion is given to the shaft 80 and consequently to the shaft 46 and to the wheels 21 and 22 by the pinions 34, 35 and the gear wheels 32, 33. The star wheel 85 moves alternately in and out of the path of the pin 86 and the arrangement is such that the pin wheel 87 makes one revolution without the pin 86 engaging the star wheel 85, and makes a second revolution engaging the star wheel 85 to give the latter a quarter turn, it being understood that the star wheel is provided with four radial slots, as indicated in Figures 8 and 9, thus producing a ratio of 1 to 7, or, in other words, the image on the film opposite the opening 27 is in motion one-seventh of the length of time the image is at rest. In case a higher ratio is desired, the star wheel 85 is provided with three radial slots so that the ratio is 1 to 11, that is, the image on the film opposite the opening 27 is in motion one-eleventh of the time the picture is at rest.

In order to impart a lengthwise sliding movement to the shaft 80 with a view to move the star wheel 85 alternately in and out of the path of the pin 86, the following arrangement is made: The outer end of the shaft 80 is mounted to turn in a shifting collar 100 pivotally connected by a pitman 101 with a crank pin 102 held on a crank shaft 103 journaled in suitable bearings arranged on the main frame 20. On the shaft 103 is secured a bevel gear wheel 104 in mesh with a pinion 105 fastened to the shaft 90 so that when the latter is rotated a rotary motion is transmitted by the pinion 105 and the bevel gear wheel 104 to the crank shaft 103 which by the crank pin 102, the pitman 101 and the collar 100 imparts a sliding motion to the shaft 80 in the direction of the length thereof so that the star wheel 85 in one position (see Figure 10) is in the path of the pin 86, and in another position, as shown in Figure 11, the star wheel 85 is out of the path of the pin 86. The hub 88 of the pin wheel 87 is provided with a cut-out portion 110 for the passage of the points of the star wheel 85 when the latter is intermittently rotated by the pin 86. The pivot pins 112 of the pitman 101 extend through the shifting collar 100 into an annular groove 113 formed in the shaft 80 (see Figure 14) so that the shaft 80 is free to turn in the shifting collar 100 and the movement given to the latter causes a sliding of the shaft 80 in the direction of the length thereof.

By the use of the step down pinions 34, 35 in mesh with the gear wheels 32, 33, the wheels 21, 22 can be made sufficiently large to simultaneously engage a large number of sprockets of the said wheels 21, 22 with the film 23 thus permitting the rotation of the wheels 21, 22 at a high rate of speed without danger of tearing the film.

In case of the ordinary moving picture machines where the film is fed by the machine between straight tracks and tension springs, the same object, high rate of film speed without danger of tearing, can be obtained by the direct use of five or six pointed Geneva stars, see Figures 15 and 16, without any gear combinations as the accompanying film feeding sprockets are sufficiently large to prevent damage to the film.

It is understood that although I have shown and described a star wheel having three or four radial slots, see Figures 6, 8 and 9, I prefer to use a star wheel with more than four slots, see Figures 15 and 16, to decrease or increase the ratio of the periods of rest and movement of the film correspondingly. It is also understood that the proportional dimensions of the step down gearing 32, 33, 34 and 35 for the rolling contact machine may be varied to allow an increase in the size of the wheels 21 and 22 with a view to engage more sprockets of these wheels with the apertures at the sides of the film 23. In the ordinary straight track moving picture machine this gearing 32, 33, 34 and 35 may be omitted.

The moving picture machine is provided with a suitable film feeding device 120 and with a shutter 125 operating in conjunction with the projecting lens 126, as indicated in Figure 1. Suitable means are employed for actuating the film feeding device 120 and the shutter 125 on the operator turning the handle 76.

Having thus described my invention, I claim as new and desire to secure by Letters Patent:—

1. A moving picture machine provided with an intermittent feeding device for the film, comprising a continuously driven shaft, a shaft to be rotated intermittently, a star wheel secured on one of the said shafts and having, at least, five radial slots, a star wheel pin rotating with the other shaft, and means moving one into and out of the path of the other to connect and disconnect the star wheel and the pin.

2. A moving picture machine provided with an intermittent feeding device for the film, comprising a continuously driven shaft, a shaft to be rotated intermittently, a star wheel secured on one of the said shafts and having, at least, five radial slots, a star wheel pin rotating with the other shaft, and means moving one into and out of the path of the other to connect and disconnect the star wheel and the pin, the said means being actuated from the said continuously rotating shaft.

3. A moving picture machine provided with an intermittent feeding device for the film, comprising a continuously driven shaft, a shaft to be rotated intermittently, a star wheel secured on one of the said shafts and having, at least, five radial slots, a pin carrier provided with a star wheel pin and rotating with the other shaft, and actuating means driving one of said shafts and moving one into and out of the path of the other to connect and disconnect the said star wheel and pin.

4. An intermittent rotary feeding mechanism comprising a Geneva star wheel having, at least, five radial slots, a revoluble pin, and means to move one axially relative to the other with a view to move one in and out of the path of the other.

5. An intermittent feeding device, comprising a revoluble pin, a Geneva star wheel having, at least, five radial slots, and means for moving the pin alternately into and out of the path of the said star wheel slots.

6. An intermittent feeding device, comprising a revoluble pin carrier, a pin mounted to turn in the said carrier, a Geneva star wheel adapted to be engaged by the said pin, and means imparting a sliding movement to the said pin carrier in the direction of the axis of the carrier and star wheel to move the pin in and out of the path of the star wheel.

7. An intermittent feeding device, comprising a revoluble pin wheel, a hub provided with a Geneva star wheel in engagement with the said hub, the said Geneva star wheel having, at least, five radial slots, a pin mounted to slide in the said pin wheel and adapted to move into and out of the path of the said star wheel slots, and means imparting a sliding movement to the said pin in the direction of the axis of the said pin wheel and the star wheel to move the pin in and out of the path of the star wheel slots.

8. An intermittent feeding device, comprising a revoluble shaft, a pin wheel secured on the said shaft and provided with a hub having an opening, a Geneva star wheel engaging the hub of the said pin wheel, a pin mounted to slide in the said pin wheel into and out of the path of the said star wheel, a pin carrier supporting the said pin and mounted to slide on and to turn with the said shaft, a crank wheel driven from the said shaft, a bearing mounted loosely on the said shaft and engaged by the said pin carrier, and a pitman connecting the said crank wheel with the said bearing.

9. An intermittent feeding device comprising a Geneva star wheel, a revoluble pin wheel having a hub provided with an opening, the hub being engaged by the said star wheel, a pin mounted to slide in the said pin wheel in and out of the path of the said star wheel, a pin carrier supporting the said pin and having a shoe adapted to open and close the said opening, and means imparting a reciprocating motion to the said pin carrier to move the pin in and out of the path of the star wheel.

10. The combination with a moving picture machine having an intermittent alternating film feeding mechanism and a driving means therefor; of driving means therebetween for effecting the operation of said mechanism whereby to produce a ratio between the periods of rest and motion of approximately five to one and a maximum pull per hole in pounds on the film of less than 10 pounds, said means including a film guiding means, a Geneva star of at least five radial slots therein, a revoluble pin, and means for moving the pin alternately into and out of the path of travel of said star wheel slots, said pin being mounted to move on its support independently of its operating means.

11. A moving picture machine comprising a film feeding means including a driving shaft, a driven shaft operated intermittently at each alternate rotation of the driving shaft, and means cooperative therewith and forming drive connections therebetween whereby a speed ratio is obtained between the periods of rest and motion of the film of at least 5 to 1, and whereby the maximum pull per hole in pounds on the film is 5.5, or less, said feeding means comprising a Geneva star wheel having at least five radial slots, a star wheel pin mounted for rotation, one being adapted to be continuously driven and the other rotated intermittently, and means for moving one into and out of the path of the other to connect and disconnect the star wheel and the pin.

12. In an intermittent feed mechanism for moving picture machines, the combination with a film engaging means for guiding the same; of an intermittent feeding device for the film comprising a continuously driven shaft, a shaft to be rotated intermittently, a star wheel secured on one of said shafts and having at least five radial slots, a star wheel pin rotating with the other shaft and means moving one into and out of the path of the other to connect and disconnect the star wheel and the pin and constituting means operatively connecting the driving and driven shafts to intermittently turn the driven shaft step by step at each alternate turn of the drive shaft whereby to produce a ratio between the periods of rest and that of the film's motion exceeding 3 to 1 and a maximum pull per hole in pounds on the film of 9.8, or less, whereby to reduce the strain on the film when changing from one picture to another so as to permit an increase in the speed of the change without damaging the film.

13. In an intermittent feed mechanism for moving picture machines, the combination with a film-engaging means for guiding the same; of an intermittent feeding device for the film comprising a continuously driven shaft, a second shaft operatively connected with the film-engaging and moving means, a star wheel carried by one of the shafts and having at least five radial slots, a star wheel and pin rotating with the other shaft, means whereby said star wheel and pin are brought into engagement upon each alternate rotation of the driven shaft to impart an intermittent alternating rotation to the second-named shaft and whereby said second-named shaft is alternately idle, and whereby to produce a speed ratio between the periods of rest and motion of the film of at least 5 to 1 and to reduce the maximum pull per hole in pounds on the film to a minimum, or to a maximum below the damaging or breaking point or strain of the film.

14. The combination with a moving picture machine having an intermittent alternating film feeding mechanism; of means for effecting the operation of said mechanism whereby to produce a ratio between the periods of rest and motion of approximately 5 to 1 and a maximum pull per hole in pounds on the film within safe limit of the tensile strength of the film, said means comprising a star wheel having at least five radial slots, a star wheel pin mounted for rotation, one being adapted to be continuously driven and the other intermittently rotated, and means for moving one into and out of the path of the other to connect and disconnect the star wheel and the pin, whereby to reduce the strain on the film when changing from one picture to another and to permit an increase in the speed of the change without damaging the film in order to eliminate the flicker and to utilize a greater percentage of the source of light and make it possible to detect the change or so-called "travel-ghost" when forced to discard the shutter on account of a weak source of light, and whereby the picture may be covered at least three times between each change of picture.

15. A moving picture machine comprising a film feeding means including a driving shaft, a driven shaft operated intermittently at each alternate rotation of the driving shaft, and means cooperating therewith whereby a speed ratio is obtained between the periods of rest and motion of the film of at least 5 to 1, and whereby the maximum pull per hole in pounds on the film is less than 10 pounds and within safe limit of the breaking point of the film, whereby to reduce the strain on the film when changing from one picture to another and to permit an increase in the speed of the change without damaging the film, said means comprising a shutter suitably driven, a continuously driven shaft, a second shaft operatively connected to the film engaging and moving means, a star wheel having at least five radial slots and secured on one of said shafts, a star wheel pin rotating with the other shaft, and means moving one into and out of the path of the other to connect and disconnect the star wheel and the pin, said means being actuated from said continuously rotating shaft whereby to produce a speed ratio between the periods of rest and motion of the film of at least five to one, to reduce the maximum pull per hole in pounds on the film to a minimum, or to a maximum below the damaging or breaking point or strain on the film, and permitting the light to be shut off between the change of pictures more than three times and at least forty-eight times per second.

16. In a moving picture machine, a film guiding means, a film feeding means, said film feeding means including a driving shaft, a driven shaft operated intermittently at each alternate rotation of the driving shaft, a Geneva star of at least five slots on one of said shafts, a revoluble pin, said pin engaging the slots of the Geneva star intermittently during each alternate rotation thereof to intermittently rotate the Geneva star step by step, an eccentric for moving one into and out of the path of the other to connect and disconnect the star wheel and the pin whereby to produce a ratio between the periods of rest and motion of the film exceeding three to one and a maximum pull per hole in pounds on the film of less than six pounds and permit covering of the picture between each change of picture at least three times.

17. In a moving picture machine provided with feeding and guiding means for moving the film through the machine by rolling contact, and an intermittent driving means for the feeding and guiding means, comprising a continuously driven shaft, a shaft to be rotated intermittently, a star wheel secured on one of said shafts, a star wheel pin rotating with the other shaft, and means moving one into and out of the path of the other to connect and disconnect the star wheel and pin to impart an intermittent alternating motion to the feeding means and film, thereby permitting the light to be shut off between the change of pictures more than three times.

MATTHIAS J. VINIK.